United States Patent Office 3,816,633
Patented June 11, 1974

3,816,633
METHOD FOR PRODUCING A COMMERCIALLY STERILE SHELF-STABLE CONTAINERIZED FRIED MEAT PRODUCT
Warren R. Schack, Western Springs, Ill., assignor to Swift & Company, Chicago, Ill.
No Drawing. Filed July 14, 1972, Ser. No. 271,994
Int. Cl. A23b 1/00
U.S. Cl. 426—407                                  10 Claims

ABSTRACT OF THE DISCLOSURE

An improved method for preparing a commercially sterile shelf-stable containerized fried meat product which has been packed in containers in the absence of a liquid filler medium is disclosed herein. Meat pieces, such as chicken, fish, beef and the like are first heat-treated to reduce the moisture content therein, fried and immediately packed and sealed under vacuum in containers. The containerized products are then subjected to a critical sequence of heat sterilization steps to achieve commercially acceptable shelf-stable sterility. This critical sequence of steps comprise first subjecting the containerized products to an elevated temperature of between about 190–210° F., such as by a retort process, for approximately 5–15 minutes and then subjecting the products to a higher elevated temperature for a period of time that has been calculated to provide commercial shelf-stable sterility to the product. After cooling and storage at ambient temperatures, the meat pieces exhibit firm, fresh tasting conditions substantially similar to fresh fried meat.

---

The instant invention relates to the food processing art and more particularly pertains to an improved method for producing a commercially sterile shelf-stable containerized fried meat product which has been packaged in the absence of a liquid filler medium.

Heretofore, attempts to provide a shelf-stable substantially dry containerized fried meat product which exhibits a firm texture and remains fresh tasting after long periods of storage at ambient temperatures have met with little success. It has been particularly difficult to produce a consumer acceptable shelf-stable containerized product of fried chicken, fish, veal cutlets and the like. The primary difficulty arises from the fact that such meat products are highly susceptible to microbial spoilage and thus, when packed and sealed in containers, such as cans or jars, must be subjected to severe heat processing to achieve commercially acceptable shelf-stable sterility. The difficulty is enhanced when the fried meat products are packaged in containers in the absence of a liquid medium. Usually, containerized products which are subjected to elevated temperatures to achieve commercially acceptable shelf-stable sterility are packed with a liquid filler in the containers. The liquid functions as a heat transfer medium which provides a rapid transfer and distribution of sterilizing heat evenly throughout the container and product so that less severe heat sterilization conditions can be utilized to achieve the shelf-stable sterility. However, when products are packed and sealed in containers with the absence of a liquid filler, there is no medium to rapidly and evenly distribute sterilizing heat throughout the container during a heat sterilization process. Hence, parts or areas of the containerized products receive a more severe heat sterilization treatment than others during the time calculated as that being required to achieve commercial shelf-stable sterility throughout the whole containerized product. It has been observed that containerized fried meat products, particularly fried chicken, which have been packed and sealed in containers and subjected to convention heat sterilization procedures to achieve shelf-stable sterility, appear to be severely heat degraded, particularly on the surfaces. Moreover, the resulting product, after storage, does not exhibit firm, fresh tasting conditions substantially similar to a comparable fresh fried meat product.

There is a process for preparing a dry-packed, canned, fried chicken product known in the prior art. The process is disclosed in U.S. Pat. No. 3,539,362, issued to Laurens. The process includes the steps of coating pre-cooked chicken parts with a moisture impermeable, edible polymer prior to packing the parts into cans and subjecting the containerized product to a conventional heat sterilization process. It is disclosed that the edible polymer coating seals the chicken parts which prevents overcooking when the containerized products are subjected to the conventional heat sterilization process, e.g., subjecting the products to an elevated temperature for a time period calculated to provide commercially acceptable shelf-stable sterility. However, it is believed that the prior art process of Laurens would produce an inferior fried chicken product which would have taste, texture and appearance characteristics wholly unlike fresh fried chicken primarily due to the presence of the edible polymer coating on the chicken parts.

Therefore, it is an object of the present invention to provide an improved method of producing a commercially sterile shelf-stable containerized fried meat product which is packed in the absence of a liquid filler medium that will retain firm, fresh tasting conditions after storage at ambient temperatures.

It is another object of the invention to provide an improved process for producing a commercially sterile shelf-stable containerized fried meat product, such as fried chicken, fish, veal cutlets, beef and the like whereby fried meat parts or pieces are packed under controlled vacuum in containers in a partially dry form and subjected to a critical sequence of heat sterilization steps at elevated temperatures calculated to achieve commercially acceptable shelf-stable sterility without severe heat degradation of the meat products.

It is yet another object of the invention to provide an improved process for producing a commercially sterile shelf-stable containerized fried meat product which is packed under vacuum in the absence of a liquid filler medium whereby the containerized fried meat product is subjected to a critical sequence of heat sterilization steps which provide a rapid, even distribution of sterilizing heat throughout the container and product without severe heat degradation of the product.

It is a further object of the instant invention to provide a heat processed fried meat product, such as fried chicken, fish, veal cutlets, beef steak and the like, which is suitable for packing in a partially dry form into a container with the absence of a liquid filler that can be subjected to a critical sequence of heat sterilization steps without loss of firmness and fresh taste characteristics.

It will be understood that the term "shelf-stable," "commercially sterile," "shelf-stable sterility," "commercially acceptable shelf-stable sterility" and the like, as used herein, denote subjecting a containerized product to elevated temperatures for inverse periods of time which have been calculated to adequately destroy spoilage organisms therein to a commercially acceptable and nutritionally safe sterilization level. Suitable time and temperature requirements are conventionally defined by those skilled in the art by $F_0$ values (sterility values) which are basically time equivalents calculated at 250° F. Particular elevated temperatures at inverse time periods required to achieve commercially acceptable shelf-stable sterility are highly variable, depending upon type and size of container, type and size of food product, acidity of product, and the like. Reference is directed to the National Canners Association Laboratory Manual for the Canning Industry," Second Edition, 1956, for further information on this matter and how F values (sterility values) are calculated by those skilled in the art.

The use of the term "meat" herein is meant to include poultry, fish, beef and all similar flesh products which are normally highly susceptible to microbial spoilage when packed in containers and stored at ambient temperatures. Furthermore, it will be understood that the term "frying" as used herein denotes deep-fat frying, pan frying, dry heat frying, such as by subjecting the product to infra-red heat, microwave energy, and any other heat processing method which will coagulate meat proteins and/or will produce a golden brown color to a breaded meat product.

Generally, the instant invention involves first heat treating raw meat pieces under conditions which will reduce the moisture content and coagulate the meat proteins. The heat-treated meat pieces are breaded, fried and immediately packed into containers which are sealed, preferably under controlled vacuum. The containerized products are then subjected to elevated temperatures in a critical sequence of heat sterilization steps to achieve commercially acceptable shelf-stable sterility. This critical sequence of heat sterilization steps comprise initially subjecting the containerized products to an elevated temperature of between 190–210° F. for about 10–15 minutes, and then subjecting the products to a higher temperature for a period of time which has been calculated to provide an adequate commercially acceptable sterilization thereof in accordance with the standards recognized in the art. It has been discovered that the initial heat sterilization step aids in the transfer and distribution of sterilizing heat throughout the container and product during the second heat sterilization step. Apparently, during the first step some moisture retained in the packed meat pieces is released in the form of a vapor which fills the voids of the sealed container. The vapor acts as an efficient heat transfer medium which rapidly and evenly transfers and distributes the sterilizing heat provided during the second sterilization step throughout the container and product so that shelf-stable sterility throughout the product can be achieved with less severe heat sterilization treatment. Thus, shelf-stable sterility is achieved without substantial heat degradation on the part of the packed meat pieces.

The commercially sterile shelf-stable containerized products can be stored at ambient temperatures for long periods of time and, upon opening, each of the meat pieces or parts exhibits a firm condition along with a fresh taste substantially comparable to fresh-fried meat products.

More particularly, the raw meat pieces are first heat processed or treated in any manner known in the art that will reduce the moisture content therein to a level which will provide an efficient heat transfer medium when the meat pieces are subsequently packed into containers in the absence of a liquid filler and subjected to the critical series of heat sterilization steps. This heat processing also fixes or coagulates the meat proteins to a point whereby the pieces appear to be only slightly undercooked. It has been determined that if there is too little moisture retained in the heat processed meat pieces (excessive heat processing) the products, when packed and sealed in containers, must be subjected to a prolonged heat treatment at the required elevated temperatures to achieve commercially acceptable shelf-stable sterility. This results in a heat degraded product. Apparently there is insufficient moisture remaining in the pieces that can be released in vapor form to provide an efficient heat transfer medium. On the other hand, the moisture content of the heat treated pieces cannot be too high, for excessive moisture content promotes the loss of fried flavor and results in the collection of substantial free juices in the container after the heat sterilization steps.

I have found that heat processing raw meat pieces to between about 85 to 95% raw weight yield, i.e., to about a 10–15% raw weight reduction, provides an adequate moisture reduction thereof to a partially dry form. Such heat treated meat pieces can be subsequently packed in containers and subjected to the heat sterilization steps to achieve commercial shelf-stable sterility, as described more particularly hereafter, without being heat degraded.

As stated hereinbefore, raw meat pieces, particularly chicken parts, can first be heat treated in any manner known in the art, such as by broiling, boiling, frying, microwave-heating, etc., to reduce the moisture content adequately to provide the preferred 10–15% raw weight reduction and/or 85–90% raw weight yield. It is preferred to heat process the raw meat pieces by microwave-heating, in combination with a steam tunnel. Microwave-heating provides the reduction of moisture content evenly throughout the meat pieces and at the same time evenly coagulates the meat proteins. Moreover, microwave-heating penetrates through the surface tissue of the meat pieces, minimizing surface heat treatment and excessive moisture loss throughout. I have found that a 10–15% weight reduction in raw chicken parts can be easily provided by microwave-heating the chicken parts to an internal temperature of between about 170° F. to about 210° F. The resultant parts have sealed surfaces and the meat proteins are substantially coagulated. However, the parts are still sufficiently moist internally.

An additional advantage in the use of a microwave heating process is that raw meat pieces can be first heat treated to the preferred 10–15% raw weight reduction in a continuous manner. For example, a microwave heating unit, in combination with a steam tunnel, can be combined with a conveyor belt which has its speed regulated so that raw meat pieces placed thereon will be subjected to the microwave heating only for a period of time sufficient to raise the internal temperature of such pieces to about 170–210° F.

The initially heat-processed meat pieces are then preferably breaded in accordance with any standard technique known in the art. For example, pieces can be coated with a batter and then contacted with a breading mix of bread and cracker crumbs, flour, flavor ingredients, and the like. The batter may comprise any of the ingredients normally utilized, such as flour, eggs, salt, water, milk, etc. Moreover, the breading and/or battering-breading can be accomplished by the use of any conventional machinery known in the art.

Of course, it will be understood that the breading of the meat pieces is optional in the practice of the invention. However, the breading is preferred for it is believed that breaded meat pieces are more acceptable to the consumer. Moreover, the breading aids the retention of moisture in the meat pieces prior to, during and after the critical sequence of heat sterilization steps.

The meat pieces are next fried to further seal the surfaces thereof and to impart a golden brown cooked color thereto. In the case of breaded meat pieces, the frying step sets the bread coating along with browning it. Frying is preferably accomplished by either submerging the meat pieces in a heated oil bath of about 350–375° F. for about 1 to 2½ minutes or by subjecting the pieces to substantially dry heat such as that provided by an infra-red frying tunnel. The particular length of frying time and temperature utilized to impart the desired browning will vary with individual meat pieces and heat sources and is best determined by observation. However, the frying step should not be at such temperatures and times which would substantially reduce the moisture content of the meat pieces.

After the frying operation, at least one of the meat pieces is immediately packed into a suitable container, and preferably about 2 to 4 pieces are packed together to provide a filled container having a net weight of about 5–14 ounces. The containers are then immediately sealed under a controlled vacuum of about 10–15 inches of mercury. Preferably the meat pieces are packed and sealed as rapidly as possible to maintain the internal temperature of the product and to prevent further moisture loss due to evaporation. When packed, the pieces usually have an internal temperature of about 170–200° F.

It is to be understood that the meat pieces can be packed under vacuum and sealed in any type of container conventionally utilized for packaging and storing food products at shelf-stable sterility. Examples of suitable containers contemplated for use in the instant invention are enameled metal cans, glass jars or bottles, flexible pouches of laminated metal foil-thermoplastic resins, and the like. Moreover, any type of packaging apparatus known in the art can be utilized.

The sealed containerized fried meat products are then subjected to the critical sequence of heat sterilization steps mentioned hereinbefore to achieve commercially acceptable shelf-stable sterility thereof. Preferably, the heat sterilization steps are carried out under a positive pressure in a pressurized apparatus such as a conventional retort apparatus. Usually, a plurality of containerized products are subjected to the critical sequence of steps at one time. To accomplish this the containerized products are preferably held at a temperature of between 170–180° F. until enough are packed for a full load for a retort apparatus. This will provide all the containers with an internal temperature of at least 170° F. or above for the start of the critical sequence of steps. However, the containerized products should not be held over 30 minutes before being subjected to said steps.

As mentioned hereinbefore, it has been found that during the heat sterilization or retort processing it is mandatory that the containerized products be subjected to at least two heat sterilization steps in critical sequence in order to provide a commercially sterile shelf-stable product which will exhibit the desired firm and fresh tasting conditions after storage. First, the containerized products are subjected to an elevated temperature of between about 190–210° F. for about 5–15 minutes, both time and temperature being dependent upon the specific container's type and size and net weight of product. This initial heat sterilization step is believed to promote the release of moisture retained in the heat treated meat pieces in a vapor form which fills the voids of the sealed container. This moisture vapor acts as a heat transfer medium which evenly and rapidly distributes the sterilizing heat throughout the container when the product is subjected to the subsequent heat sterilization step. It has been found that if the initial heat sterilization step is omitted, the product must be subjected to a higher temperature and/or for a longer period of time to achieve shelf-stable sterility which results in heat degradation of the meat parts, particularly on the product surfaces. Hence, the moisture vapor released by the initial heat sterilization step provides an efficient heat transfer medium throughout the container and product.

The containerized products are then retorted at or subjected to a higher elevated temperature for a sufficient period of time calculated to produce shelf-stable sterility thereof. The particular range of elevated temperatures and times, i.e., severity of heat processing, is highly variable and is dependent upon several product characteristics and process conditions, e.g., size and type of meat product, acidity, size and type of container, etc., to provide shelf-stable sterility. It has been determined that shelf-stable sterility can be achieved in a preferred containerized product by subjecting it to a higher elevated temperature of between about 210–250° F. for a time period sufficient to provide an $F_0$ (sterility value) of between about 3 to 8 in the product, which is well recognized in the art to be commercially sterile and shelf-stable. More particularly, it has been found that shelf-stable sterility in a preferred containerized product, such as 4 fried chicken parts weighing about 10–14 net ounces which are packed in an enameled metal can, can be achieved by retorting or subjecting the containerized product to a higher elevated temperature of about 235–250° F. for about 100–130 minutes, inversely. The step of subjecting the preferred containerized product to this range of elevated temperatures and times will result in an $F_0$ (sterility value) of about 3–8.

After the sterilization steps, the containerized products are then cooled to ambient temperature. Upon opening after storage the fried meat pieces are in a firm condition not normally associated with commercially sterile products and have a flavor and texture substantially similar to fresh fried meat products.

The following Examples illustrate specific embodiments in the invention but the Examples are to be considered in an illustrative sense and not in a limitative manner.

EXAMPLE I

Fryer chickens, weighing approximately 2¾ to 3 pounds each are cut up into portions and placed onto a moving conveyor belt of a microwave-steam chamber combination unit. Four pieces of product (1 wing, 1 thigh, 1 leg and 1 half-breast) have an average weight of about 11½ to 11¾ ounces. The generators of the microwave unit are set on high and steam valves to the chamber are adjusted to provide 3–5 pounds steam pressure to the plurality of openings in the manifold. The speed of the conveyor belt is set to control the shrink and internal temperature of the chicken pieces for a desired 85% yield and a 170–200° F. internal temperature of the breast meat after passing through the unit. After passing through, the above-mentioned four pieces of produce weigh 10 to 10½ ounces. The heat processed chicken parts are then dipped into a batter solution comprising flour, salt, starch, spices and water, and fully coated with a breading mixture of bread crumbs, starch, flour, salt, spices and the like. The parts are then dipped into a bath of oil at 375° F. for about one minute until a golden brown color is observed. Upon removal therefrom, four pieces of product (1 wing, 1 leg, 1 thigh and 1 half-breast) have an average net weight of about 12 ounces. The chicken parts are then immediately packed into 404 x 309 enameled metal cans, four pieces to a can, and immediately sealed under 12–15 inches of vacuum to maintain maximum product temperature. During packing, the internal temperature of the parts average between 170–190° F. As the containerized products are sealed, they are held in a cook basket of a retort apparatus at 180° F. until the cook basket is filled. The retort apparatus is then sealed and the containerized products are subjected to a temperature of 210° F. for 5 minutes. The temperature is immediately increased to 235° F. and held for 130 minutes under a pressure of 3–5 pounds overriding air pressure which has been calculated to provide an $F_0$ (sterility value) of about 8. The canned products are then cooled to below 210° F., removed from the retort apparatus and allowed to chill to ambient temperature. Upon opening the sealed can, the fried chicken parts are still intact, i.e., the breading is attached to the skin and meat attached to the bone. The pieces are firm, yet not dried out. They have a taste substantially similar to cooled fresh fried chicken.

EXAMPLE II

Chicken parts (drumsticks, thighs, breasts and wings) are passed through a microwave-steam chamber combination unit as described in Example I. The microwave unit is set to supply microwave energy through the various inlet feeds in the apparatus totalling approximately 8¾ kw. The steam chamber is adjusted to provide positive saturated steam at a temperature of approximately 200–210° F. The chicken parts are exposed to the microwave energy and saturated steam atmosphere for approximately 1 minute which results in raising the internal temperature of the parts to about 180–190° F. Moreover, this heat treatment produces an average weight reduction, based upon raw weight, of between about 10–15% (85–90% raw weight yield). The heat treated chicken parts are then battered and breaded in accordance with standard techniques, being dipped in a batter solution of flour, salt, eggs and water, and coated with a mixture of bread crumbs, flour, seasoning, and starch. The breaded meat pieces are next deep fat fried in a fat of 350° F. for approximately 1 to 2½ minutes, or until a golden brown color is observed. Upon removal from the hot frying fat the chicken parts have an internal temperature averaging between about 185–195° F. The pieces are then immediately hand packed into 404 x 309 enameled aluminum cans, four pieces to a can, and sealed therein under 10–12 inches of vacuum. After the cans are sealed, they are held in a retort basket of a retort apparatus of a temperature of 170° F. until the retort basket is filled. The retort apparatus is then closed and the containerized products are heated at 190° F. for 15 minutes. Immediately thereafter, the temperature is elevated to 235° F. and the containerized products are subjected thereto for 115 minutes under an overriding air pressure of 3–5 pounds. Finally, the containerized products are precooled, removed from the retort apparatus and chilled to room temperature. It has been determined that the above heat sterilization steps provide a shelf-stable sterility of about $F_0$ 6 (sterility value based on 250° F.). Upon opening after storage, the fried chicken parts exhibit texture, appearance and flavor characteristics identical to those described in Example I.

EXAMPLE III

Pieces of veal are passed through the microwave energy-steam chamber combination described in Example I. The microwave unit is set to supply approximately 8¾ kw. of microwave energy and the steam chamber is adjusted to provide about 3–5 pounds positive saturated steam at approximately 200–210° F. The speed of the conveyor belt of the unit is adjusted to subject the veal pieces to the microwave energy and saturated steam for approximately 1–3 minutes whereupon the moisture content of the pieces is reduced to provide approximately a 10–15% weight reduction, based upon raw weight. The heat treated veal pieces are then battered and breaded in accordance with standard techniques known in the art and immediately placed into a bath of hot oil at 375° F. The pieces are held in the frying oil until a golden brown color is observed. Upon removal therefrom the pieces are immediately hand packed into 404 x 309 enameled metal cans, two pieces of product weighing approximately 12–14 ounces net weight per can. The packed cans are immediately sealed under a vacuum of 10–15 inches. The canned products are then placed in a retort basket of a conventional retort apparatus and held at a temperature of 180° F. until the basket is filled. The retort apparatus is then sealed and the containerized products are subjected to a temperature of 200° F. for 10 minutes. The temperature is immediately increased to 250° F. and held for 100 minutes under a pressure of 3–5 pounds overriding air pressure which has been calculated to provide an $F_0$ (sterility value) of approximately 8 to the product. Finally, the products are chilled, removed from the retort apparatus and cooled to room temperature. After storage at ambient temperatures, the fried veal pieces exhibit no signs of process or storage degradation and when heated, have taste and texture characteristics comparable to fresh fried veal cutlets.

Obviously many modifications and variations of the invention as hereinbefore set forth may be made without departing from the spirit and scope thereof, and, therefore, only such limitations should be imposed as are indicated in the appended claims.

I claim:

1. An improved method for producing a commercially sterile, shelf-stable, containerized fried meat product wherein fried meat pieces are vacuum packed in containers in the absence of a liquid filler, said method comprising: heat processing raw meat pieces to reduce the moisture content therein adequately to provide a weight reduction in said meat pieces of about 10–15% based on the net raw weight; frying the heat processed meat pieces at temperatures and times so as not to substantially reduce the moisture content of the meat pieces; immediately packing at least one of said meat pieces in a container under vacuum; subjecting the vacuum packed containerized product which has an internal temperature of at least 170° F. to an elevated temperature of between about 190–210° F. for approximately 5–15 minutes whereby some of the moisture retained in the vacuum packed meat is released in the form of a vapor which fills the voids of the sealed container and acts as a heat transfer medium which evenly and rapidly distributes the sterilizing heat throughout the container when the meat product therein is subjected to the subsequent heat sterilization step, and immediately thereafter subjecting said containerized product to a higher temperature of between about 210–250° F. for a period of time sufficient to obtain a shelf-stable meat product having an $F_0$ sterility value of between about 3–8.

2. The method of claim 1 wherein said containerized products are maintained at a temperature of 170–190° F. prior to being subjected to the first heat treatment step.

3. The method of claim 2 wherein said meat pieces are heat processed to an internal temperature of between about 170–210° F. to reduce the moisture content therein prior to frying.

4. The method of claim 3 wherein said raw meat pieces are first heat processed by microwave energy.

5. The method of claim 4 wherein said meat pieces are selected from the group consisting of chicken, fish, and beef.

6. The method of claim 5 wherein said containers are enameled metal cans.

7. The method of claim 6 wherein the heat processed meat pieces are breaded prior to frying.

8. The method of claim 7 wherein 2 to 4 of said meat pieces are packed in the can and sealed therein under a vacuum of about 10–15 inches Hg, said containerized products weighing approximately 5–14 ounces net weight.

9. The method of claim 8 wherein said containerized products are finally subjected to a temperature of about 235–250° F. for approximately 100–130 minutes, inversely, to achieve an $F_0$ sterility value of between about 3–8.

10. The method of claim 9 wherein said meat pieces are chicken.

References Cited
UNITED STATES PATENTS

| | | | |
|---|---|---|---|
| 3,192,053 | 6/1965 | Kueck et al. | 99—187 |
| 3,539,362 | 11/1970 | Laurens | 99—187 |

HYMAN LORD, Primary Examiner